(12) United States Patent
Wu

(10) Patent No.: US 10,854,400 B2
(45) Date of Patent: *Dec. 1, 2020

(54) THIN TYPE MECHANICAL KEYBOARD SWITCH

(71) Applicant: DONGGUAN CITY KAIHUA ELECTRONICS CO., LTD, Guangdong (CN)

(72) Inventor: FuXi Wu, Guangdong (CN)

( * ) Notice: Subject to any disclaimer, the term of this patent is extended or adjusted under 35 U.S.C. 154(b) by 0 days.

This patent is subject to a terminal disclaimer.

(21) Appl. No.: 16/395,224

(22) Filed: Apr. 25, 2019

(65) Prior Publication Data

US 2019/0252136 A1 Aug. 15, 2019

Related U.S. Application Data

(63) Continuation of application No. PCT/CN2017/107676, filed on Oct. 25, 2017.

(30) Foreign Application Priority Data

Oct. 27, 2016 (CN) .......................... 2016 1 0952320

(51) Int. Cl.
| | |
|---|---|
| *H01H 13/85* | (2006.01) |
| *H01H 13/7065* | (2006.01) |
| *H01H 3/12* | (2006.01) |
| *H01H 13/20* | (2006.01) |
| *G06F 1/16* | (2006.01) |

(52) U.S. Cl.
CPC ........ *H01H 13/7065* (2013.01); *H01H 3/125* (2013.01); *H01H 13/20* (2013.01);
(Continued)

(58) Field of Classification Search
CPC ........ H01H 15/02; H01H 15/06; H01H 1/242; H01H 13/12; H01H 13/28; H01H 13/48;
(Continued)

(56) References Cited

U.S. PATENT DOCUMENTS

| | | |
|---|---|---|
| 8,937,520 B2 | 1/2015 | Kan |
| 9,672,999 B1 | 6/2017 | Zou |

(Continued)

FOREIGN PATENT DOCUMENTS

| | | |
|---|---|---|
| CN | 204464128 | 7/2015 |
| CN | 205050718 | 2/2016 |

(Continued)

OTHER PUBLICATIONS

"International Search Report (Form PCT/ISA/210)", dated Jan. 25, 2018, with English translation thereof, pp. 1-4.

(Continued)

*Primary Examiner* — Ahmed M Saeed
(74) *Attorney, Agent, or Firm* — ZANIP

(57) ABSTRACT

A thin type mechanical keyboard switch including a base and a keycap arranged on the base is provided. The base is provided with a first side accommodating groove, a conducting component. The base is further provided with a second side accommodating groove, a middle accommodating groove disposed between the first and the second side accommodating grooves, and a surrounding groove arranged around an upper end edge of the base. A balance rack is arranged in the surrounding groove, and the second side accommodating groove is provided with a torsional spring. The middle accommodating groove is provided with a blocking piece, a hanging piece, a tension spring and a guiding core. A through groove is formed between the first side accommodating groove and the middle accommodating groove. The through groove—is provided with a piston located between the guiding core and the conducting component.

10 Claims, 4 Drawing Sheets

(52) U.S. Cl.
CPC ........... *H01H 13/85* (2013.01); *G06F 1/1666* (2013.01); *G06F 1/1671* (2013.01); *H01H 2215/03* (2013.01)

(58) Field of Classification Search
CPC ........ H01H 13/52; H01H 13/56; H01H 13/20; H01H 13/36; H01H 13/365; H01H 13/14; H01H 3/125; H01H 13/7065; H01H 2221/044; H01H 2221/036
See application file for complete search history.

(56) References Cited

U.S. PATENT DOCUMENTS

| | | |
|---|---|---|
| 9,799,466 B2 | 10/2017 | Wu |
| 2013/0249658 A1 | 9/2013 | Kan |
| 2017/0062152 A1 | 3/2017 | Wu |
| 2019/0267200 A1* | 8/2019 | Wu ................. H01H 13/14 |

FOREIGN PATENT DOCUMENTS

| | | |
|---|---|---|
| CN | 105470005 | 4/2016 |
| CN | 106356233 | 1/2017 |
| CN | 206541758 | 10/2017 |
| DE | 202016104694 | 12/2016 |
| JP | 3207387 | 11/2016 |
| TW | M542224 | 5/2017 |

OTHER PUBLICATIONS

"Written Opinion (Form PCT/ISA/237) of PCT/CN2017/107676", dated Jan. 25, 2018, with English translation thereof, pp. 1-8.

\* cited by examiner

THIN TYPE MECHANICAL KEYBOARD SWITCH

CROSS-REFERENCE TO RELATED APPLICATION

This is a continuation of International Application No. PCT/CN2017/107676, filed on Oct. 25, 2017, which claims the priority benefits of China Application No. 201610952320.6, filed on Oct. 27, 2016. The entirety of each of the above-mentioned patent applications is hereby incorporated by reference herein and made a part of this specification.

BACKGROUND

Technical Field

The present disclosure relates to a keyboard switch, especially to a thin type mechanical keyboard switch.

Description of Related Art

Electronic equipment requires a keyboard switch as input means for many applications, therefore, quality of the keyboard switch determines user experience of the input device, which requires the keyboard switch to have a good sense of touch and sound reaction. In the existing thin type keyboard switch which utilizes a metal contact sheet as a dynamic contact piece, an elastic force of the metal contact sheet is relatively insufficient due to the limitation of the internal space of the switch, and a sense of pressing is insufficient. Manufacturers have been making improvements from the metal sheet material, shape as well as other aspects to increase the pressing user experience; however, the improvements are always limited to the sense of touch while pressing. Due to the limitation of the internal space of the thin type keyboard switch, it is almost impossible to achieve a sound reaction while pressing like a large keyboard switch.

At the same time, the keyboard switch has a poor stability during use, which makes the using experience not smooth, affecting normal use.

SUMMARY

In order to overcome the forgoing problems, a purpose of the disclosure is to provide a thin type mechanical keyboard switch, which may improve stability, achieve good sense of touch during pressing, and generate a sound reaction during pressing, thereby enhancing the user experience.

Technical solutions adopted by the present disclosure are as follows:

A thin type mechanical keyboard switch includes a base and a keycap arranged on the base. The base is provided with a first side accommodating groove, a conducting component arranged on the first side accommodating groove. The base is further provided with a second side accommodating groove, a middle accommodating groove disposed between the first side accommodating groove and the second side accommodating groove. A surrounding groove is arranged around an upper end edge of the base. A balance rack is arranged in the surrounding groove, and the second side accommodating groove is provided with a torsional spring. The middle accommodating groove is provided with a blocking piece, a hanging piece, a tension spring and a guiding core. One end of the tension spring is clamped in the guiding core and connected with the hanging piece, and the other end of the tension spring is connected with the balance rack. A through groove is formed between the first side accommodating groove and the middle accommodating groove. The through groove is provided with a piston located between the guiding core and the conducting component.

Furthermore, a cover is provided between the base and the keycap. The cover is located on top of the torsional spring, the tension spring and the conducting component. The cover provides an opening through which the guiding core passes.

Furthermore, the base is further provided with a stator.

Furthermore, a card slot is arranged along a side edge of the guiding core and also along a side edge of the piston, and a slot is provided at a lower end of the guiding core into which the tension spring is inserted.

Furthermore, the conducting component includes a static contact and a dynamic contact. The piston is arranged between the guiding core and the dynamic contact.

Furthermore, the balance rack is an X-shaped rack comprising a left U-shape rack and a right U-shape rack. An open end of the left U-shape rack intersects with an open end of the right U-shape rack. A front fixed leg of the left U-shape rack and a front fixed leg of the right U-shape rack are respectively fixed in the surrounding groove. A rear fixed leg of the left U-shape rack and a rear fixed leg of the right U-shape rack are respectively fixedly connected to a lower end of the keycap.

Beneficial effects of the present disclosure include:

1. Balancing performance of the keyboard switch is further improved by the combination of the X-shaped balance rack with the tension spring. Compared with traditional single balance lever, the structural design of the X-shaped balance rack of the present disclosure is more stable.

2. The sound may be generated and the sense of touch is improved by the control of the conducting component and the torsional spring through the guiding core.

3. The dynamic contact of the conducting component is merely subjected to a positive force by utilizing the piston, which lowers the risk of deforming the dynamic contact and improves the stability.

The above is a brief introduction of the technical solutions, the present disclosure will be further described in accompany with the drawings and specific embodiments.

DESCRIPTION OF THE EMBODIMENTS

Figure 1:
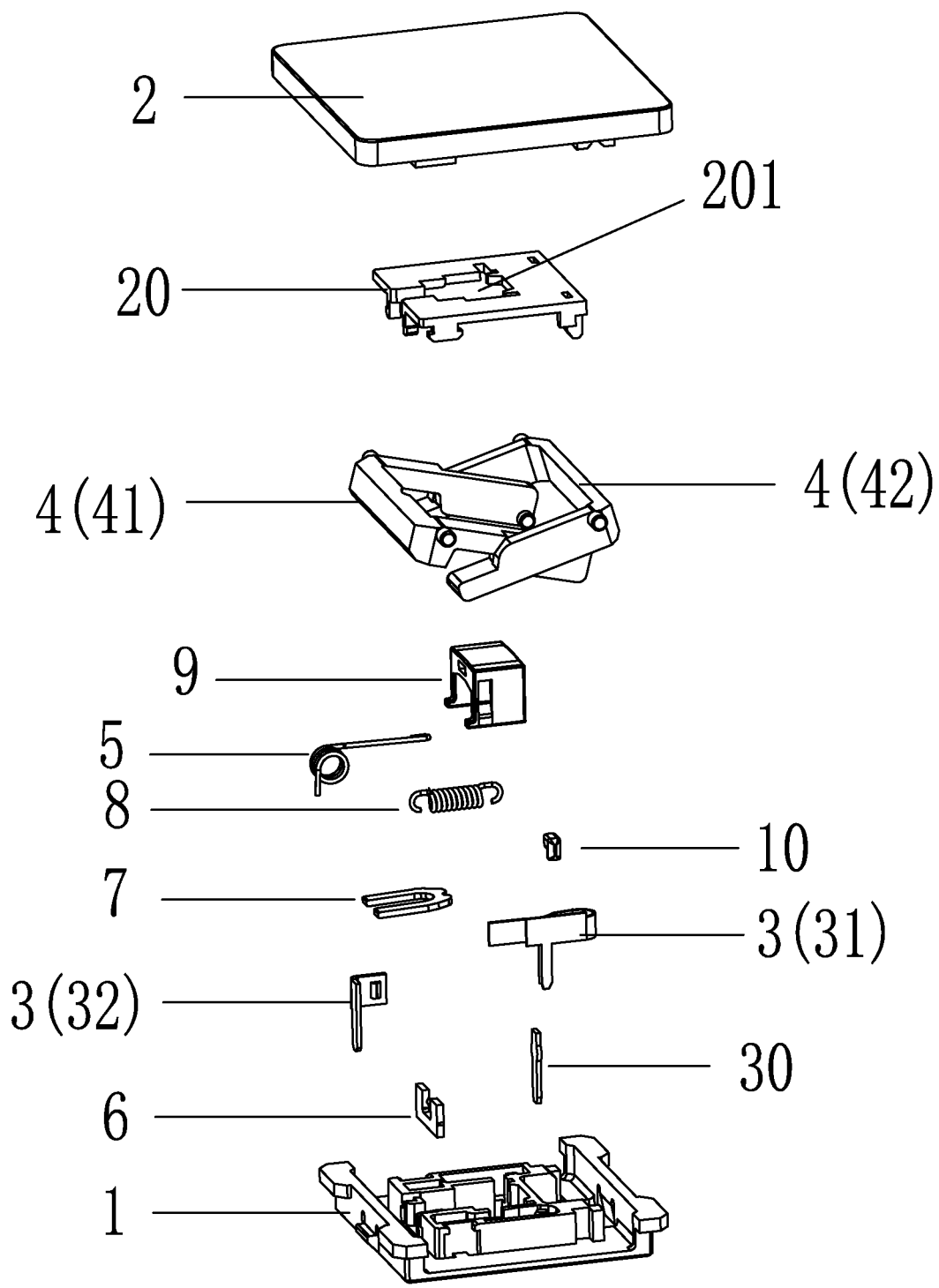
FIG. 1 is an exploded view according to an embodiment of the present disclosure.
Figure 2:
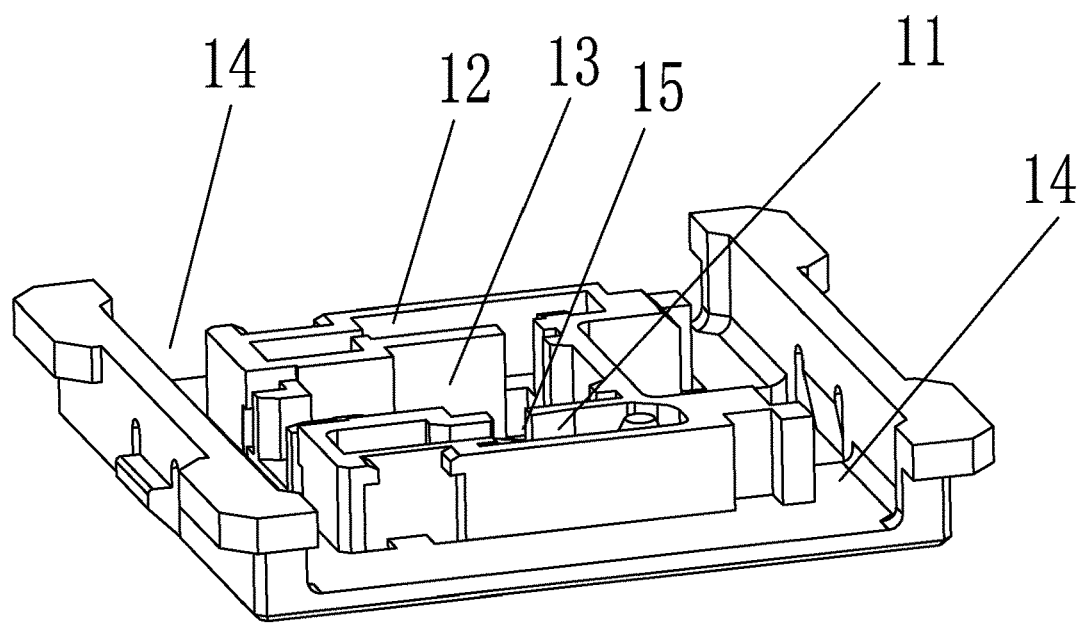
FIG. 2 is a structural schematic view of a base according to an embodiment of the present disclosure.
Figure 3:
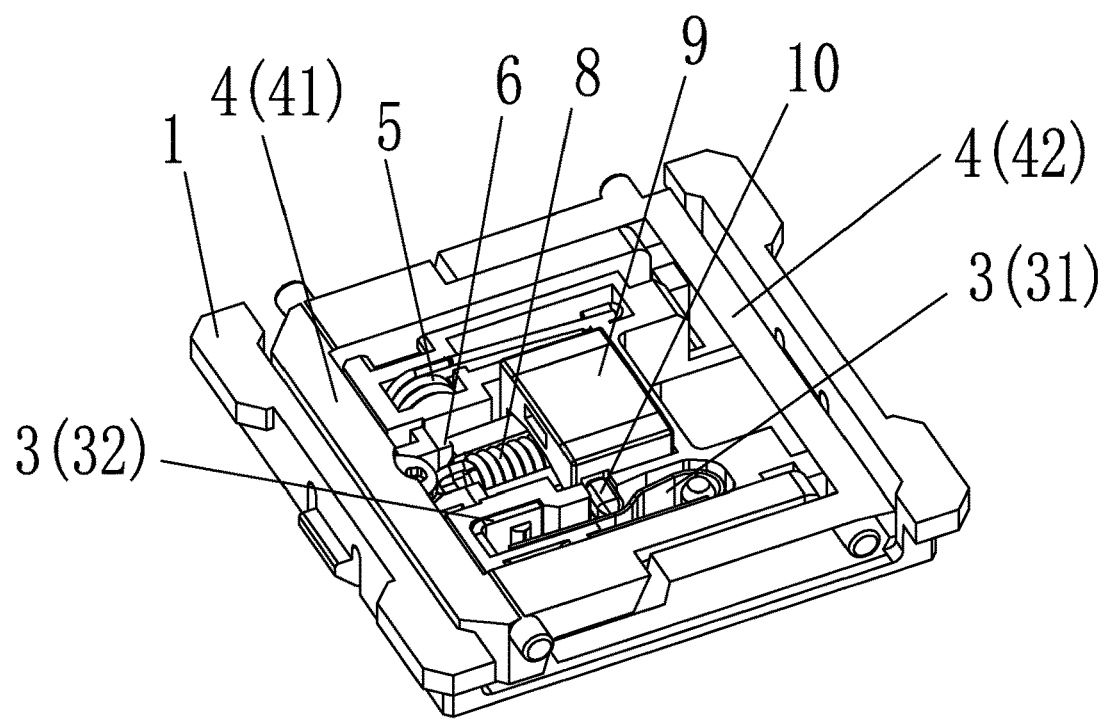
FIG. 3 is a partial structural schematic view according to the embodiment of the present disclosure.

In order to further illustrate the technical solutions and effects of the present disclosure for achieving the purpose of the present application, the present disclosure will be further described in details in accompany with the drawings and preferred embodiments.

Referring to FIG. 1 to FIG. 4, an embodiment of the present disclosure provides a thin type mechanical keyboard switch which comprises a base 1 and a keycap 2 arranged on the base 1. The base 1 is provided with a first side accommodating groove 11. A conducting component 3 is arranged on the first side accommodating groove 11. The base 1 is further provided with a second side accommodating groove 12, a middle accommodating groove 13 disposed between the first side accommodating groove 11 and the second side accommodating groove 12, and a surrounding groove 14 arranged around an upper end edge of the base 1. A balance rack 4 is arranged in the surrounding groove 14, and the second side accommodating groove 12 is provided therein with a torsional spring 5. The middle accommodating groove 13 is provided therein with a blocking piece 6, a hanging piece 7, a tension spring 8 and a guiding core 9. One end of the tension spring 8 is clamped in the guiding core 9 and connected with the hanging piece 7, and the other end of the tension spring 8 is connected with the balance rack 4. A through groove 15 is formed between the first side accommodating groove 11 and the middle accommodating groove 13. The through groove 15 is provided with a piston 10 located between the guiding core 9 and the conducting component 3.

As shown in FIG. 1, a cover 20 is provided between the base 1 and the keycap 2. The cover 20 is located on top of the torsional spring 5, the tension spring 8 and the conducting component 3 for fixing the torsional spring 5, the tension spring 8 and the conducting component 3 in place, and avoiding the torsional spring 5, the tension spring 8 and the conducting component 3 from being separated from the base 1 while the switch is pressed. The cover 20 provides an opening 201 through which the guiding core 9 may pass. While the switch is pressed, the guiding core 9 may move upwards and downwards though the opening 201. In the present embodiment, the cover 20 is a plastic cover, which may achieve better electrical isolation from conductive parts. Furthermore, the base 1 is further provided with a stator 30.

Figure 4:
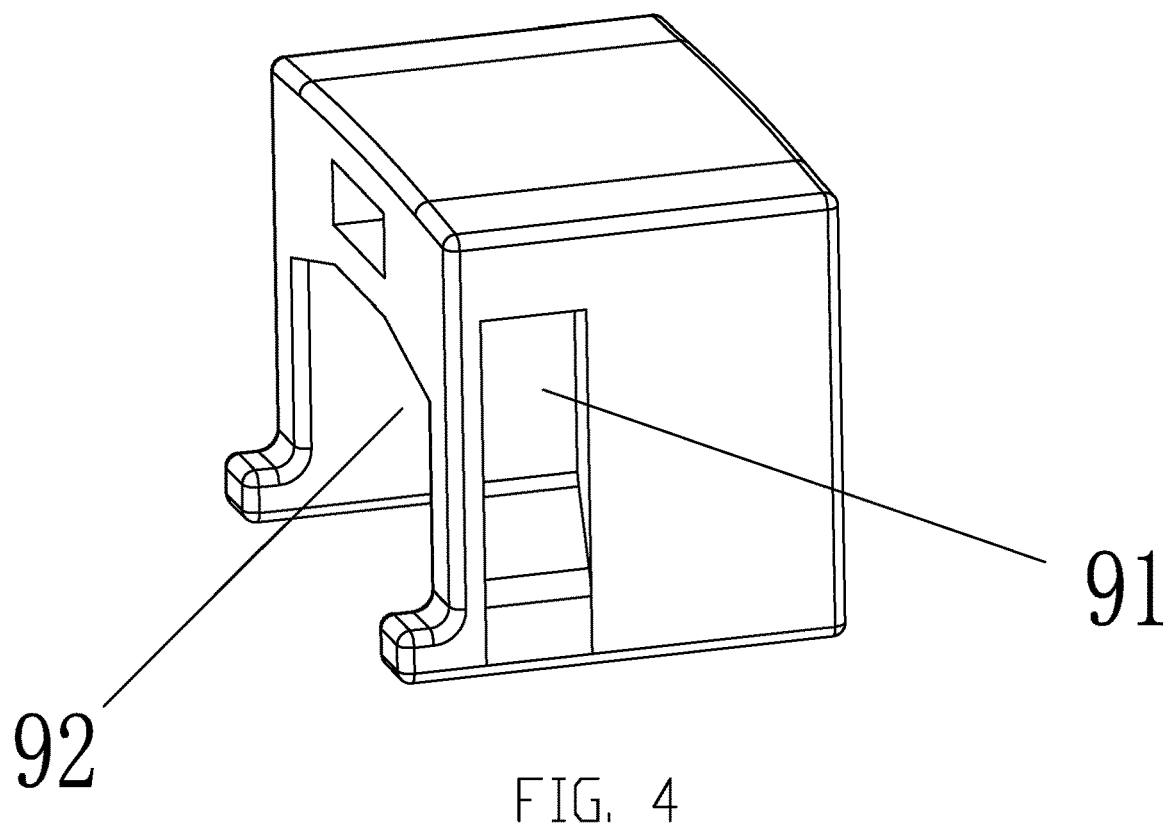
FIG. 4 is a structural schematic view of a guiding core according to the embodiment of the present disclosure.

As shown in FIG. 4, a card slot 91 is arranged along a side edge of the guiding core 9 and also along a side edge of the piston 10, and a slot 92 is provided at a lower end of the guiding core 9 into which the tension spring 8 may be inserted. One end of the tension spring 8 is inserted into the slot 92 of the guiding core 9, such that there exists an upward resilience for the guiding core 9 applied by the tension spring 8. Therefore, the keyboard switch under a pressed state is under force to restore itself upwards until a natural state.

As shown in FIG. 1, the conducting component 3 includes a static contact 31 and a dynamic contact 32. The piston 10 is arranged between the guiding core 9 and the dynamic contact 21.

As shown in FIG. 1, the balance rack 4 is an X-shaped rack which comprises a left U-shape rack 41 and a right U-shape rack 42. An open end of the left U-shape rack 41 intersects with an open end of the right U-shape rack 42. Furthermore, a front fixed leg of the left U-shape rack 41 and a front fixed leg of the right U-shape rack 42 are respectively fixed in the surrounding groove 14. A rear fixed leg of the left U-shape rack 41 and a rear fixed leg of the right U-shape rack 42 are respectively fixedly connected to a lower end of the keycap 2.

Figure 5:
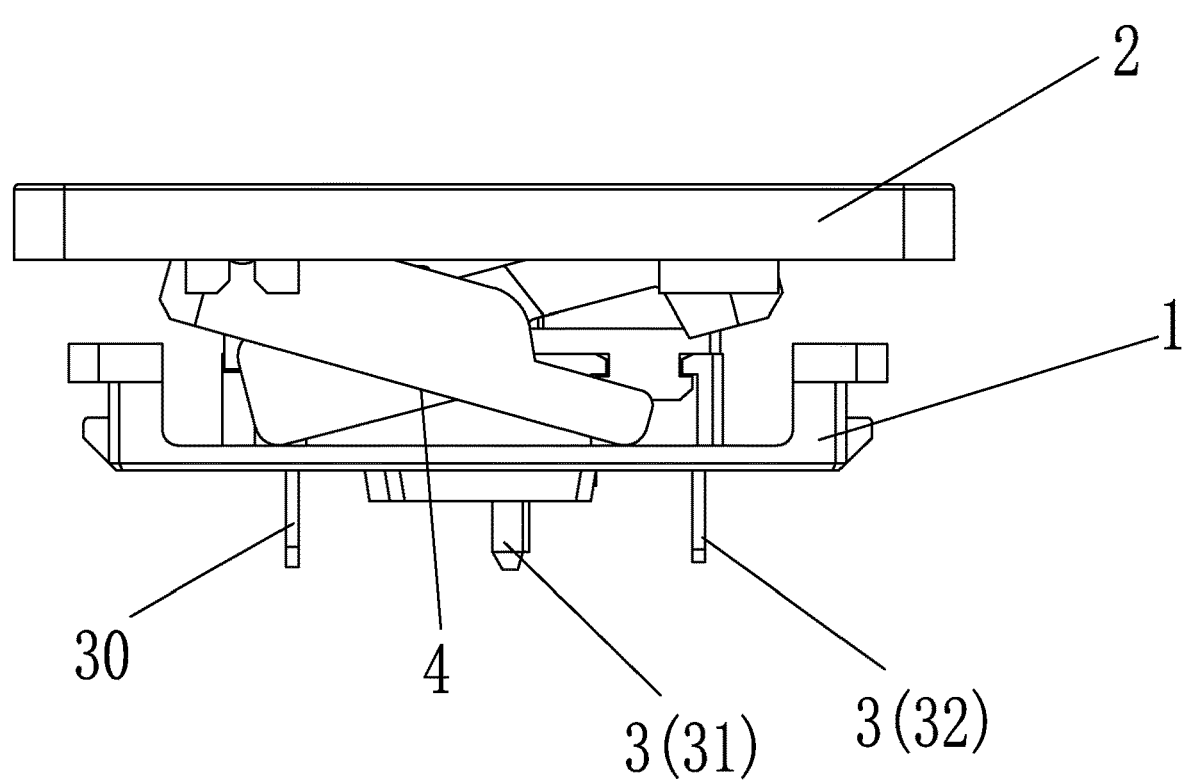
FIG. 5 is a structural schematic view of a keyboard switch in a natural state according to the embodiment of the present disclosure.
Figure 6:
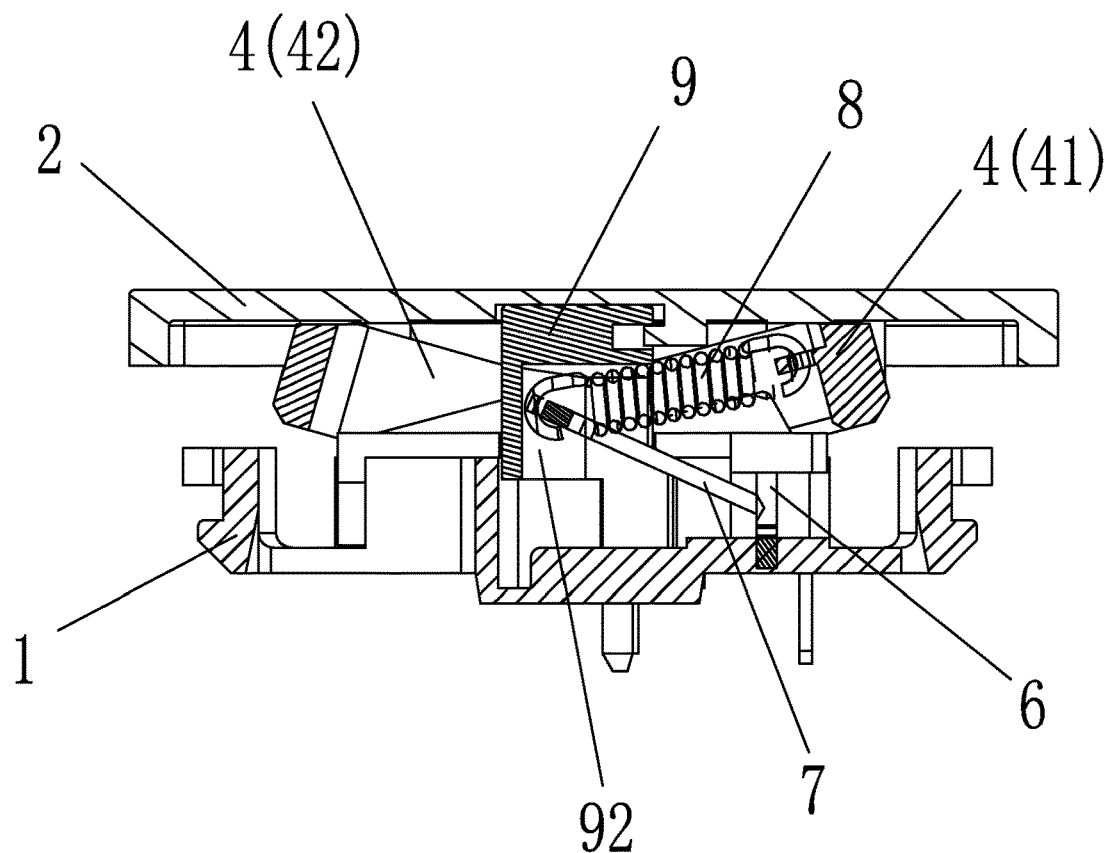
FIG. 6 is a section view of the keyboard switch in a natural state according to the embodiment of the present disclosure.
Figure 7:
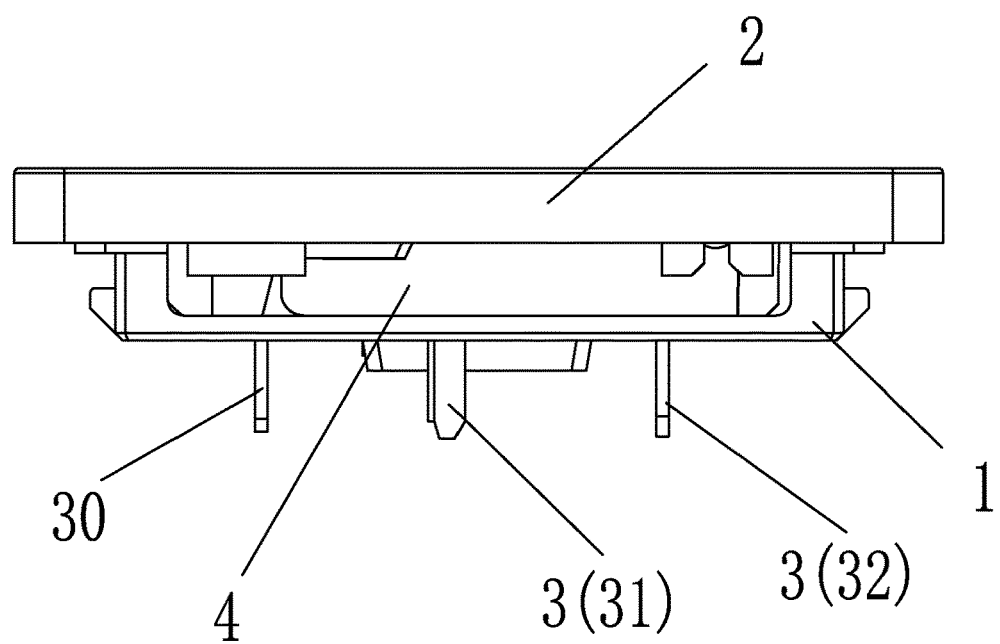
FIG. 7 is a structural schematic view of the keyboard switch being pressed in a stop state according to the embodiment of the present disclosure.

FIG. 5 and FIG. 6 are structural views of the keyboard switch which is not under pressed state. When the keycap 2 is pressed down, the keycap 2 may push the guiding core 9 and the balance rack 4 to move downwards. The downward movement of the guiding core 9 may drive the piston 10 and the torsional spring 5 to move, such that the dynamic contact 3 of the conducting component 3 is in contact with the static contact 31, thereby achieving conduction of the keyboard switch. FIG. 7 is a structural view of the keyboard switch which is pressed to a stop state. When the keycap 2 is no longer under pressure, the resilience of the tension spring 8 may apply an upward force towards the guiding core 9, such that the keyboards switch under the pressed state may restore itself until a natural state. At the same time, since the resilience of the torsional spring 5 may generate sound by clicking the base 1, the keyboard switch may achieve disconnecting function.

Key points of the present disclosure include:

1. Balancing performance of the keyboard switch is further improved by the combination of the X-shaped balance rack with the tension spring. Compared with traditional single balance lever, the structural design of the X-shaped balance rack of the present disclosure is more stable.

2. The sound may be generated and the sense of touch is improved by the control of the conducting component and the torsional spring through the guiding core.

3. The dynamic contact of the conducting component is merely subjected to a positive force by utilizing the piston, which lowers the risk of deforming the dynamic contact and improves the stability.

The above are only preferred embodiments of the present disclosure, but not intended to limit the technical scope of the present application. Therefore, other structures obtained by utilizing the same or similar technical features as the above-described embodiments of the present disclosure are all within the protection of the present disclosure.

What is claimed is:

1. A thin type mechanical keyboard switch, comprising a base and a keycap arranged on the base, wherein the base is provided with a first side accommodating groove; a conducting component is arranged on the first side accommodating groove; the base is further provided with a second side accommodating groove, a middle accommodating groove disposed between the first side accommodating groove and the second side accommodating groove, and a surrounding groove arranged around an upper end edge of the base; a balance rack is arranged in the surrounding groove, and the second side accommodating groove is provided with a torsional spring; the middle accommodating groove is provided with a blocking piece, a hanging piece, a tension spring and a guiding core; one end of the tension spring is clamped in the guiding core and connected with the hanging piece, and the other end of the tension spring is connected with the balance rack; a through groove is formed between the first side accommodating groove and the middle accommodating groove; and the through groove is provided with a piston located between the guiding core and the conducting component.

2. The thin type mechanical keyboard switch of claim 1, wherein a cover is provided between the base and the keycap; the cover is located on top of the torsional spring, the tension spring and the conducting component; and the cover provides an opening through which the guiding core passes.

3. The thin type mechanical keyboard switch of claim 1, wherein the base is further provided with a stator.

4. The thin type mechanical keyboard switch of claim 1, wherein a card slot is arranged along a side edge of the guiding core and also along a side edge of the piston, and a slot is arranged at a lower end of the guiding core into which the tension spring is inserted.

5. The thin type mechanical keyboard switch of claim 1, wherein the conducting component includes a static contact and a dynamic contact; and the piston is arranged between the guiding core and the dynamic contact.

6. The thin type mechanical keyboard switch of claim 1, wherein the balance rack is an X-shaped rack comprising a left U-shape rack and a right U-shape rack; an open end of the left U-shape rack intersects with an open end of the right U-shape rack; a front fixed leg of the left U-shape rack and a front fixed leg of the right U-shape rack are respectively fixed in the surrounding groove; and a rear fixed leg of the left U-shape rack and a rear fixed leg of the right U-shape rack are respectively fixedly connected to a lower end of the keycap.

7. The thin type mechanical keyboard switch of claim 2, wherein the base is further provided with a stator.

8. The thin type mechanical keyboard switch of claim 2, wherein a card slot is arranged along a side edge of the guiding core and also along a side edge of the piston, and a slot is arranged at a lower end of the guiding core into which the tension spring is inserted.

9. The thin type mechanical keyboard switch of claim 2, wherein the conducting component includes a static contact and a dynamic contact; and the piston is arranged between the guiding core and the dynamic contact.

10. The thin type mechanical keyboard switch of claim 2, wherein the balance rack is an X-shaped rack comprising a left U-shape rack and a right U-shape rack; an open end of the left U-shape rack intersects with an open end of the right U-shape rack; a front fixed leg of the left U-shape rack and a front fixed leg of the right U-shape rack are respectively fixed in the surrounding groove; and a rear fixed leg of the left U-shape rack and a rear fixed leg of the right U-shape rack are respectively fixedly connected to a lower end of the keycap.

\* \* \* \* \*